(12) United States Patent
Lorthioir

(10) Patent No.: US 8,915,396 B2
(45) Date of Patent: Dec. 23, 2014

(54) DETACHABLE GRIP DEVICE

(75) Inventor: Christophe Lorthioir, Bloye (FR)

(73) Assignee: SEB SA, Ecully (FR)

( * ) Notice: Subject to any disclaimer, the term of this patent is extended or adjusted under 35 U.S.C. 154(b) by 1086 days.

(21) Appl. No.: 12/281,781

(22) PCT Filed: Feb. 22, 2007

(86) PCT No.: PCT/FR2007/000323
§ 371 (c)(1),
(2), (4) Date: Oct. 28, 2008

(87) PCT Pub. No.: WO2007/101923
PCT Pub. Date: Sep. 13, 2007

(65) Prior Publication Data
US 2009/0045207 A1    Feb. 19, 2009

(30) Foreign Application Priority Data
Mar. 6, 2006 (FR) ........................ 06 01986

(51) Int. Cl.
B65D 25/10 (2006.01)
B65D 53/00 (2006.01)
B65D 81/24 (2006.01)
B65D 39/00 (2006.01)
A47J 45/00 (2006.01)
B25G 3/32 (2006.01)
A47J 45/07 (2006.01)
A47J 45/10 (2006.01)

(52) U.S. Cl.
CPC .............. A47J 45/10 (2013.01); *Y10S 294/901* (2013.01)

USPC ........... 220/759; 220/763; 220/769; 220/789; 294/31.1; 294/901; 16/422; 16/425

(58) Field of Classification Search
CPC ....... A47J 45/061; A47J 45/07; A47J 45/071; A47J 45/10; B65D 2525/285; Y10S 16/41
USPC ................ 220/789, 759, 762, 763, 768, 769; 294/34, 901, 31.1, 28, 27.1; 16/422, 16/425, DIG. 40, DIG. 41
See application file for complete search history.

(56) References Cited

U.S. PATENT DOCUMENTS 5,704,092 A * 1/1998 Nicollet et al. ................ 16/425
6,155,463 A * 12/2000 Dentler ......................... 222/165

(Continued)

FOREIGN PATENT DOCUMENTS

| FR | 2842718 A1 | 7/2002 |
| FR | 2842718 A1 | 1/2004 |
| SU | 959748 A2 | 9/1982 |
| SU | 1253618 A1 | 8/1986 |

*Primary Examiner* — Fenn Mathew
*Assistant Examiner* — Andrew T Kirsch
(74) *Attorney, Agent, or Firm* — Bachman & LaPointe, P.C.

(57) ABSTRACT

A grip device has an element that can be moved in relation to fixed element between an open position and a closed position in which the two elements are adapted in such a way as to grip a wall, a displacement device which enables the displacement of the mobile element and the adjustment of the distance separating the two elements in a closed position to the thickness of the gripped wall, and a blocking device, which are adapted in such a way as to immobilize the mobile element in the adjusted closed position. The blocking device can be moved between a release position and a blocking position in which they immobilize the mobile element by friction in the adjusted closed position.

14 Claims, 3 Drawing Sheets

(56) References Cited

U.S. PATENT DOCUMENTS 6,257,439 B1  7/2001  Hsu
6,318,776 B1 *  11/2001  Lee .................................. 294/34
6,708,373 B2 *  3/2004  Dodane .......................... 16/425
7,481,330 B2  1/2009  Lorthioir et al.

* cited by examiner

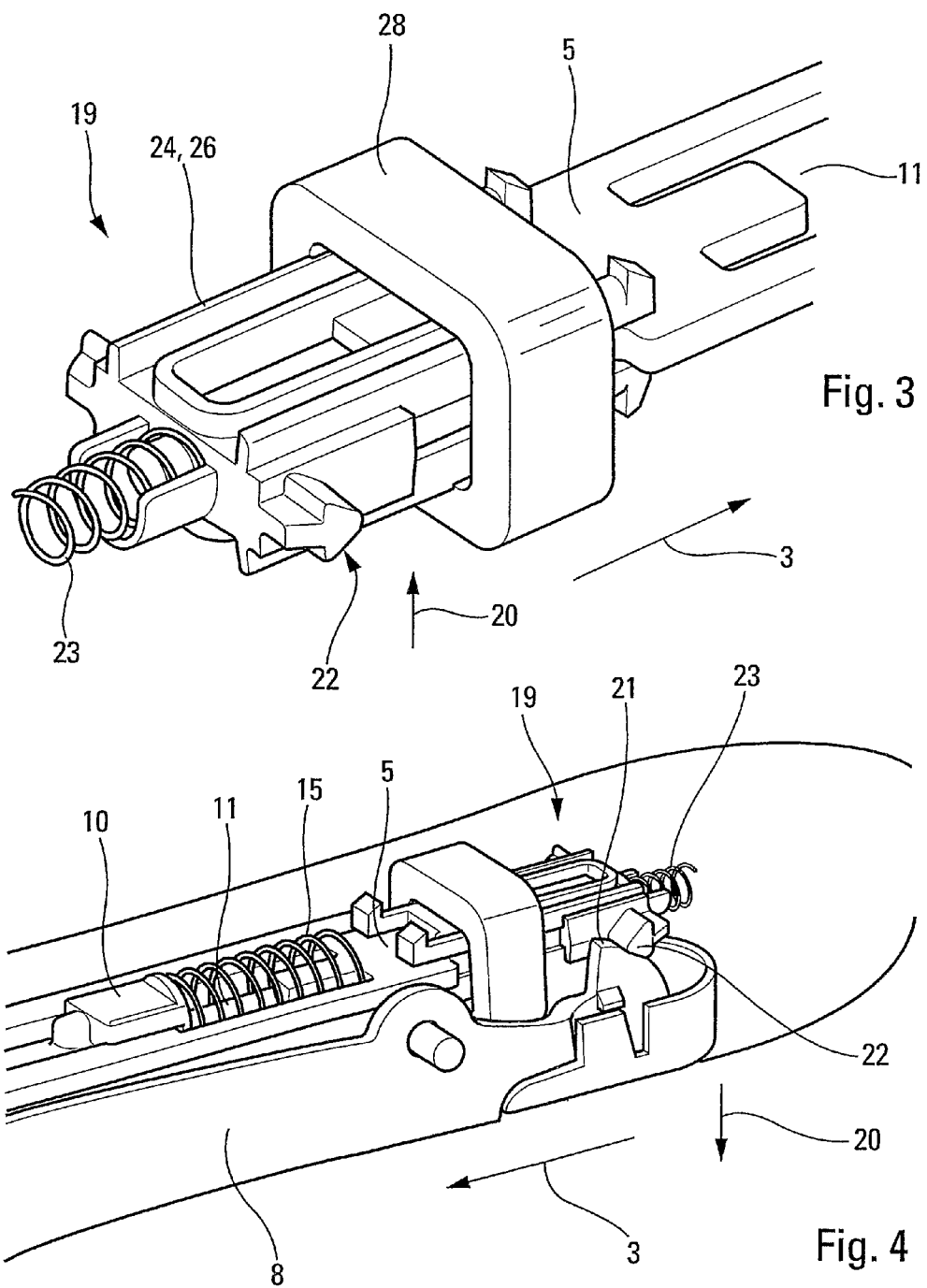

DETACHABLE GRIP DEVICE

BACKGROUND OF THE INVENTION

This invention relates to a detachable grip device of the type comprising a grip body which has a fixed element that forms a grip and which extends according to a longitudinal direction, a mobile element that forms a grip which has a mobile mounting with respect to the fixed element that forms a grip according to the longitudinal direction between an open position and a closed position in which the two elements forming the grip are adapted such that they can grip a lateral wall of a kitchen utensil, movement means adapted to be manually commanded between an opening position and a closing position, to move the mobile element that forms the grip from its open position to its closed position when they change from their opening position to their closing position, and conformed so that, when they are in their closing position, the distance separating the two elements that form the grip in the closed position corresponds to the thickness of the lateral gripped wall, and blocking means adapted to immobilise the mobile element that forms a grip in its closed position adjusted to suit the thickness of the wall gripped.

Such a grip device is described in the patent application FR 2 842 718 and the European equivalent where the blocking means are formed by a blocking pin mounted on the lever and are adapted to penetrate, when the lever is in the retracted position, a recess whose passage cross section depends on the position of the mobile element that forms a grip in the closed position. However, in this document, due to the form of the blocking pin and the recess that is formed by a slot made in the mobile element that forms a grip and by a cavity in the grip body, the pin tends to pivot in the cavity around an axis defined by its point of contact with the edge of the slot of the mobile element that forms a grip. The result is that the mobile element that forms a grip may move away from its closed adjusted position (if the pivoting of the pin occurs when a kitchen utensil is being handled), or the efficiency of the blocking means is reduced (if the pin has been deformed due to repeated solicitations). In one specific embodiment of the invention of this document, in order to avoid these disadvantages, the pin has steps on it. However, in this case, the adjustment of the position of the element that forms a grip is only made at the distance separating two consecutive steps.

SUMMARY OF THE INVENTION

This invention aims to provide a detachable grip device comprising blocking means which permit the element that forms a grip to be immobilised safely in the closed position in a position that is adjusted to the thickness of the wall of the kitchen utensil that is gripped.

According to the invention, the blocking means of the detachable grip device of the type mentioned above have a mobile mounting on the grip body according to a direction of friction that is perpendicular to the longitudinal direction, between a releasing position in which they do not obstruct the movement of the mobile element that forms a grip, and a blocking position in which they immobilise this element in its closed adjusted position by friction.

By using blocking means that are mobile between a releasing position and a blocking position, the mobile element that forms a grip may be safely immobilised in its closed adjusted position, as the immobilisation is not due to a simple penetration of a pin in a slot created in the mobile element that forms a grip due to the pivoting of the lever carrying the pin, but by the movement of means that are carried by the grip body and which consequently, regardless of their position, are very close to the mobile element that forms a grip. Furthermore, given that it is not necessary for the mobile element that forms a grip has at a given position a configuration for it to engage with the blocking means, it is precisely immobilised at the closed adjusted position.

BRIEF DESCRIPTION OF THE DRAWINGS

Other specific aspects and advantages of this invention will become clear in the description of four embodiments that are provided by way of non-restrictive examples and are illustrated in the drawings in which:

FIG. 3 is a perspective view of the blocking means of the first embodiment.

FIG. 4 is a perspective view illustrating the engagement of the blocking means of the first embodiment and the lever.

DETAILED DESCRIPTION OF THE PREFERRED EMBODIMENT(S)

Figure 1:
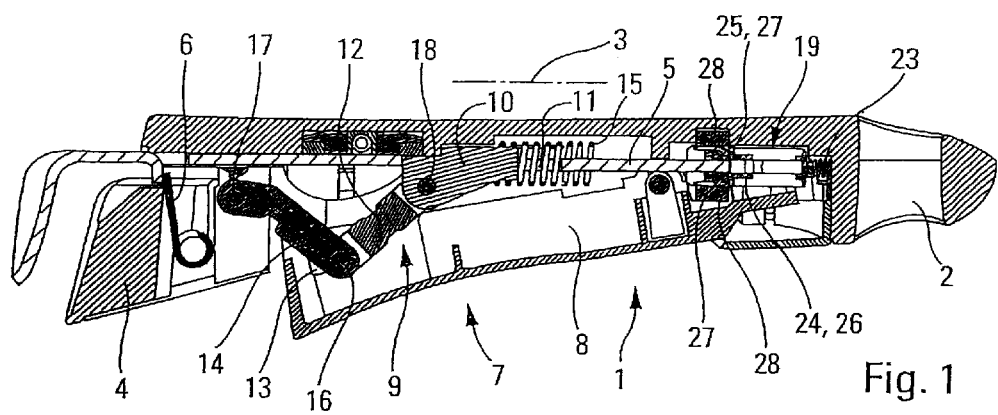
FIG. 1 is a longitudinal cross section of a detachable grip device compliant with a first embodiment of the invention, wherein the mobile element that forms a grip is in the open position and the blocking means are in their freed position.
Figure 2:
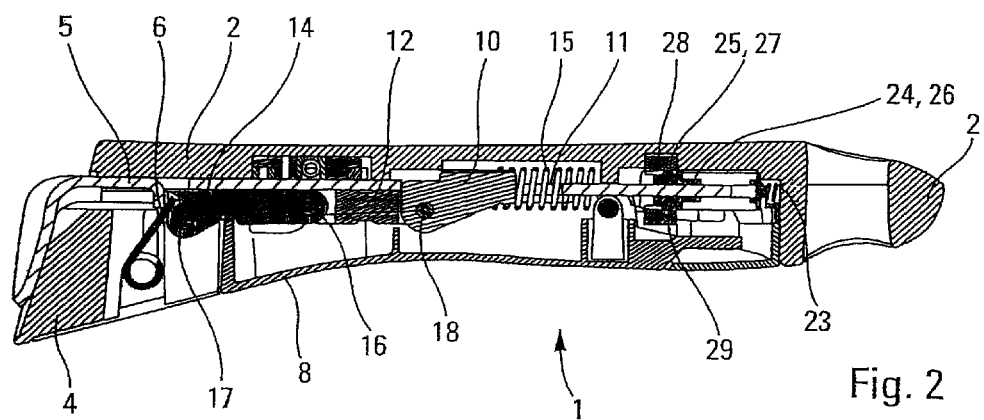
FIG. 2 is a view similar to FIG. 1, wherein the mobile element that forms a grip is in the closed position and the blocking means are in their blocked position.
Figure 5:
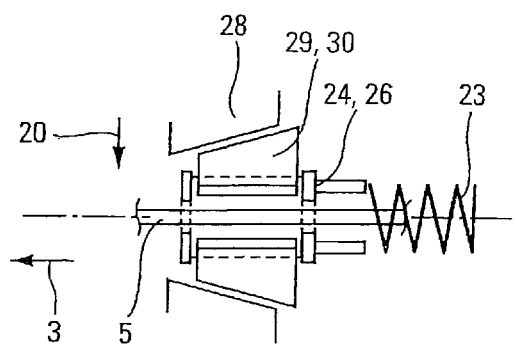
FIG. 5 is a diagram illustrating the blocking means of a second embodiment of this invention.
Figure 7:
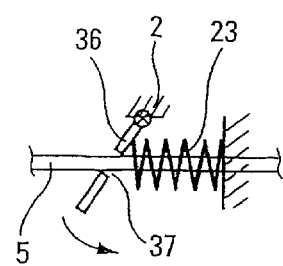
FIG. 7 is a diagram illustrating the blocking means of a fourth embodiment of this invention.
Figure 6:
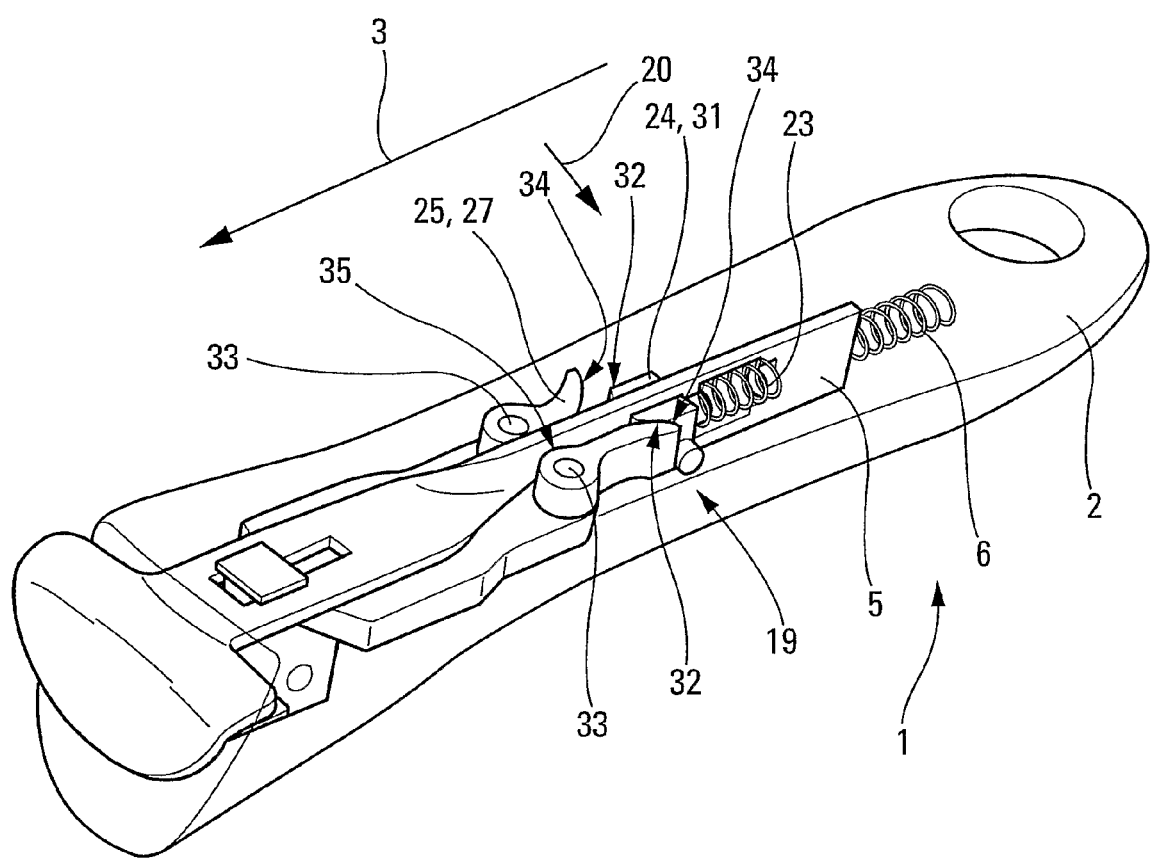
FIG. 6 is a perspective view of blocking means of a third embodiment of the invention.

The figures illustrate a detachable grip device 1, that is used to hold a kitchen utensil, especially by the lateral wall of the latter.

The detachable grip device 1 comprises a grip body 2 which mainly extends in a longitudinal direction 3 and which has a fixed element that forms a grip 4 positioned at a first end of the grip body 2. The detachable grip device 1 also comprises a mobile element that forms a grip 5 which has a mobile mounting with respect to the fixed element that forms a grip 2 according to the longitudinal direction 3 (herein translation) between an open position and a closed position in which the two elements that form a grip 4, 5 are adapted to grip the lateral wall of a kitchen utensil. In these embodiments, the mobile element that forms a grip 5 is solicited in its open position by an opening spring 6 (in this case a torsion spring) which comes into contact, on one end, with the grip body 2, and, with its other end, on the mobile element that forms a grip 5.

In order to allow a user to command the movement of the mobile element that forms a grip 5, the detachable grip device 1 comprises movement means 7 that are adapted to be commanded manually between an opening position and a closing position, and to move the mobile element that forms a grip 5 from its open position to its closed position when they move from their opening position to their closing position. In these embodiments, the movement means 7 comprise a lever 8 that is adapted to be commanded manually, and transmission means 9 that are adapted to transmit the movement of the lever 8 to the mobile element that forms a grip 5. The lever 8 has a rotary mounting on the grip body 8 between an extended position and a retracted position which correspond, respectively to the opening and closing positions of the movement means 7. The transmission means 9 comprise a slide 10 that is mounted in translation according to the longitudinal direction 2 with respect to the grip body 2 (in this case, it is mounted so that it slides along a groove 11 that extends along the mobile element that forms a grip 5), a first connecting rod 12 that has a mounting which pivots around a shaft 18, by a first end, onto the slide 10, and, which slides, by a second end in a groove 13 carried by the lever 8, and a second connecting rod 14, that has a mounting which pivots around a shaft 17, by a first end onto the grip body 2 and by a second end around a shaft 16 to the first connecting rod 12 (and therefore which slides in the groove 13 carried by the lever 8).

Furthermore, the movement means 7 are conformed so that when they leave their closing position (and therefore when the mobile element that forms a grip 5 is in its closed position), the distance separating the two elements that form a grip 4, 5 in the closed position corresponds to the thickness of the lateral wall gripped. In these embodiments, this is achieved by the presence of a compensation spring 15 which comes into contact, by its first end, with the slide 10 (and therefore on the movement means 7) and by its second end, with the mobile element that forms a grip 5.

Furthermore, in these embodiments, the movement means 7 are conformed so that they are in a stable state both in their opening position and in their closing position, and so that they pass from either one of these two stable positions via an intermediate unstable equilibrium position. In this case, the unstable equilibrium position of the movement means 7 (and therefore that of the lever 8) is defined as the position in which the shaft 16 connecting the first and second connecting rods 12, 14 passes through straight line defined by the shaft 17 connecting the second connecting rod 14 to the grip body 2 and the shaft 18 connecting the first connecting rod 12 to the slide 10.

Furthermore, in order to avoid any separation of the mobile element that forms a grip 5 when it is in the closed position (for example due to a heavy load in the kitchen utensil gripped), the detachable grip device 1 comprises blocking means 19 which are adapted to block the mobile element that forms a grip 5 in is closed position adjusted to the thickness of the lateral wall gripped.

In compliance with this invention, the blocking means 19 have a mounting that is mobile on the grip body 2 between a releasing position and a blocking position in which they immobilise the mobile element that forms a grip 5 in its adjusted closed position by friction.

In these embodiments, the blocking means 19 extend, regardless of their position, on either side of the mobile element that forms a grip 5 according to a direction of friction 20 that is perpendicular to the longitudinal direction 3 and they are adapted to immobilise the mobile element that forms a grip 5 by clamping.

In these embodiments, the blocking means 19 are moved from one of their positions to the other by the movement of movement means 7. More precisely, they are moved by the lever 8: the latter comprises (close to its connection with the grip body 2) displacing lugs 21 which are adapted to engage with a receiving surface 22 on the blocking means 19 so as to permit, in these embodiments, movement of the blocking means 19 according to the longitudinal direction 3. Furthermore, the blocking means 19 are solicited in their blocking position by a blocking spring 23. Moreover, the blocking means 19 engage with the detachable grip body 2 so that their translation movement in the longitudinal direction 3 generated by the pivoting of the lever 8 also moves them according to the direction of friction 20. In order to permit the mobile element that forms a grip 5 to be gripped only when it is effectively in its closed adjusted position, the blocking means 19 and the movement means 7 are fitted in relation to one another so that the blocking means 19 move to their blocking position when the movement means 7 are between their unstable equilibrium position and their closing position. This is achieved by the respective forms of the displacing lugs 21 and the receiving surface 22 that acts as a cam surface.

In the first, second and third embodiments, the blocking means 19 comprise command means 24 and clamping means 25. The command means 24 are mobile (in translation in this case) according to the longitudinal direction 3 between an unlocking position and a locking position. It is these means which are moved by the movement means 7 and are solicited by the blocking spring 23 towards their locking position. The clamping means 25 have a mounting that is mobile according to the direction of friction 20 between their clamping position in which they clamp and immobilise the mobile element that forms a grip and a freeing position. Their movement is commanded by the movement of the command means 24 and by their engagement with the grip body 2.

In the first and second embodiments, the command means 24 are formed by a cage 26, which surrounds the mobile element that forms a grip 5, wherein the clamping means 25 are formed by two clamping elements 27 which have a mounting that is mobile in translation according to the direction of friction 20 in the cage 26, on either side of the mobile element that forms a grip 5. Furthermore, the grip body 2 comprises two ramps 28 which are each positioned on either side of the mobile element that forms a grip 5 and immediately next to a corresponding clamping element 27. Consequently, when the cage 26, under the action of the blocking spring 23 and due to the movement of the lever 8, is taken to its locking position, the clamping elements 27, whose mountings are attached to the cage 26 for movements in the longitudinal direction 3, are driven in the direction of friction 20 in reaction against the ramps 28 until the mobile element that forms a grip 5 is clamped.

In the first embodiment, the two clamping elements 27 are formed by two cylinders 29 mounted freely in rotation in the cage 26.

In the second embodiment, the two clamping elements 27 are formed by two pads 30, wherein each pad 30 has on the side of the mobile element that forms a grip 5 a friction lining (of the type used for brakes or clutches in automobiles) and, on the opposite side, a surface that is substantially parallel to the corresponding ramp 28 on the grip body 2.

In the third embodiment, the command means 24 are formed by a pin 31 which has a command surface 32 that extends on either side of the mobile element that forms a grip 5, wherein the clamping means 25 are formed by two clamping elements 27 that are mounted, on either side of the mobile element that forms a grip 5, so that they are mobile in rotation around a shaft 33 attached to the grip body 2 and extending according to a direction that is perpendicular to the longitudinal 3 and friction 20 directions. In this case, each clamping element 27 has a receiving surface 34 adapted to engage with the command surface 32 so that the movement of the pin 31 towards its locking position causes rotation of the two clamping elements 27 around the corresponding shaft 33. Furthermore, each clamping element 27 also has a clamping surface 35 that is eccentric with respect to the shaft 33 so that it is in clamp contact with the mobile element that forms a grip 5 when the clamping element 27 is in its clamping position. Consequently, when the pin 31, actuated by the blocking spring 23 and due to the movement of the lever 8, is moved to its locking position, the clamping elements 27, by engagement of the receiving surface 34 with the command surface 32, are pivoted until the mobile element that forms a grip 5 is clamped by the clamping surface 35.

In the fourth embodiment, the blocking means 19 comprise (and more precisely are formed by) a blade 36 that is mounted so that it pivots with respect to the grip body 2 according to a direction that is perpendicular to the longitudinal direction, and which has an opening 37 through which passes the mobile element that forms a grip 5. The straight section of the mobile element that forms a grip 5 is slightly smaller than that of the opening 37 so that, the more the blade 36 is angled away from the perpendicular plane with respect to the mobile element that forms a grip 5, the more the periphery of the opening 37 moves closer to the mobile element that forms a grip 5 until the two opposite sides come into contact and create the clamping. The blocking spring 23 comes into contact with the blade 36 and against the grip body 2.

This invention is not restricted to the embodiments described above.

It is therefore possible that the blocking means are formed by a quick release nut with a fine pitch mounted on a threaded rod.

The invention claimed is:

1. A detachable grip device comprising:
a grip body extending mainly in a longitudinal direction,
a mobile element that forms a grip that can move in said longitudinal direction with respect to a fixed element that forms a second grip supported by the grip body, between an open position and a closed position in which the first and second grips are adapted to grip a lateral wall of a kitchen utensil,
movement means that are adapted to be manually commanded between an opening position and a closed adjusted position for moving the mobile element that forms the first grip from its open position to its closed position when the grips change from their open position to their closed position, and which are conformed so that, when the grips are in their closed adjusted position, the distance separating the first and second grips in the closed position corresponds to a thickness of the lateral gripped wall, and
blocking means for blocking the mobile element that forms the first grip in its closed adjusted position, the blocking means being mobile on the grip body according to the longitudinal direction and according to a direction that is perpendicular to the longitudinal direction, for applying a friction between the blocking means and the mobile element, between:
a releasing position in which the blocking means do not obstruct the movement of the first grip, and
a blocking position in which the blocking means immobilize the first grip in its closed adjusted position by friction, said blocking means comprising command means and clamping means, said clamping means comprising clamping elements which are mounted on either side of the first grip.

2. The detachable grip device of claim 1, wherein the blocking means are moved from one position to another position by the movement of the movement means, and are urged in the blocking position by a blocking spring.

3. The detachable grip device of claim 1, wherein the blocking means extend on either side of the mobile element that forms the first grip according to the direction of friction regardless of the position and the blocking means immobilize the mobile element that forms the first grip by clamping.

4. The detachable grip device of claim 3, wherein the blocking means comprise a blade mounted to pivot on the grip body and which has an opening through which passes the mobile element that forms the first grip, of which a straight section of the mobile element is slightly smaller than that of the opening so that, when the blade is moved to its blocking position by the action of the movement means and a blocking spring, the mobile element that forms the first grip is immobilized by the clamping on the periphery of the opening.

5. The detachable grip device of claim 3, wherein the command means are mobile due to action of the movement means and a blocking spring, according to the longitudinal direction between an unlocking position and a locking position, and wherein the clamping means have a mounting that is mobile in the direction of friction due to the movement of the command means and engagement with the grip body between a freeing position and a clamping position in which they immobilize the mobile element that forms the first grip.

6. The detachable grip device of claim 5, wherein each said clamping element is mounted to be mobile in rotation around a shaft attached to the grip body and supported by a clamping surface that is eccentric with respect to the shaft, so that each said clamping element grips the mobile element that forms the first grip when each said clamping element is in a clamping position, and a receiving surface adapted to engage with a command surface supported by a pin forming the command means so as to permit rotation of the each said clamping element when the pin is moved.

7. The detachable grip device of claim 5, wherein the command means are formed by a cage, in which the clamping elements are mounted so that the clamping elements are attached in the movement in the longitudinal direction, wherein the grip body has on either side of the mobile element that forms the first grip a ramp oriented so that it can receive and drive the corresponding clamping element to its clamping position when the cage is driven to its locking position.

8. The detachable grip device of claim 7, wherein each said clamping element is formed by a cylinder.

9. The detachable grip device of claim 7, wherein each said clamping element is formed by a pad which has on the side of the mobile element that forms the first grip, a friction lining and, on the opposite side, a surface that is substantially parallel to the corresponding ramp.

10. The detachable grip device of claim 2, wherein the movement means are conformed so that the movement means are in a stable state both in the open position and in the closed position, and to pass from one to the other of these positions via an intermediate unstable equilibrium position.

11. The detachable grip device of claim 10, wherein the blocking means and the movement means are positioned with respect to one another so that the blocking means pass from the blocking position when the movement means are between the unstable equilibrium position and the closed position.

12. The detachable grip device of claim 1, wherein the movement means comprise a lever adapted to be commanded manually and to move the blocking means.

13. A detachable grip device comprising:
a grip body extending mainly in a longitudinal direction;
a mobile element that forms a first grip that can move in said longitudinal direction with respect to a fixed element that forms a second grip supported by the grip body, between an open position and a closed position in which the first and second grips are adapted to grip a lateral wall of a kitchen utensil;
movement means that are adapted to be manually commanded between an open position and a closed adjusted position for moving the mobile element that forms the first grip from the first grip's open position to the first grip's closed position when there is a change from their open position to their closed position and which are conformed so that when the first and second grips are in their closed adjusted position, the distance separating the first and second grips in the closed position corresponds to a thickness of the lateral gripped wall, and blocking means for blocking the mobile element that forms the first grip in its closed adjusted position, the blocking means being mobile on the grip body according to the longitudinal direction and according to a direction that is perpendicular to the longitudinal direction, for applying a friction between the blocking means and the first grip, between:

a releasing position in which the blocking means do not obstruct movement of the first grip, said blocking means being away from the first grip; and a blocking position in which the blocking means immobilize said first grip in its closed adjusted position by clamping; and said blocking means comprising command means and clamping means, said clamping means comprising clamping elements which are mounted on either side of the first grip.

14. A detachable grip device comprising:

a grip body extending mainly in a longitudinal direction, a mobile element that forms a first grip that can move in said longitudinal direction with respect to a fixed element that forms a second grip supported by the grip body, between an open position and a closed position in which the first and second grips are adapted to grip a lateral wall of a kitchen utensil, movement means that are adapted to be manually commanded between an open position and a closed adjusted position for moving the mobile element that forms the first grip from its open position to its closed position when the change from their open position to their closed position, and which are conformed so that, when the grips are in their closed position, the distance separating the first and second grips in the closed position corresponds to a thickness of the lateral gripped wall, and blocking means for blocking the mobile element that forms the first grip in its closed adjusted position, the blocking means being mobile on the grip body according to a direction that is perpendicular to the longitudinal direction, for applying a friction between the blocking means and the mobile element, between:

a releasing position in which the blocking means do not obstruct the movement of the first grip, and a blocking position in which the blocking means immobilize the first grip in its closed adjusted position by friction, said blocking means extending on each side of the first grip according to the direction of friction, said blocking means comprising a blade mounted to pivot on the grip body and which has an opening through which passes the first grip of which a straight section of the first grip is slightly smaller than that of the opening so that, when the blade is moved to its blocking position by the action of the movement means and a blocking spring, the first grip is immobilized by the clamping on the periphery of the opening.

* * * * *